(12) United States Patent (10) Patent No.: US 12,608,120 B2

Shirai (45) Date of Patent: Apr. 21, 2026

(54) CONTROL APPARATUS, METHOD OF CONTROLLING CONTROL APPARATUS, AND STORAGE MEDIUM

(71) Applicant: CANON KABUSHIKI KAISHA, Tokyo (JP)

(72) Inventor: Hayato Shirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 18/490,509

(22) Filed: Oct. 19, 2023

(65) Prior Publication Data

US 2024/0143138 A1 May 2, 2024

(30) Foreign Application Priority Data

Oct. 26, 2022 (JP) ................................. 2022-171546

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *H04N 1/00514* (2013.01);
(Continued)

(58) Field of Classification Search
CPC . G06F 3/0483; G06F 3/0482; H04N 1/00514; H04N 1/00891; H04N 1/4413;
(Continued)

(56) References Cited

U.S. PATENT DOCUMENTS 9,798,869 B2 10/2017 Suzuki ..................... G06F 21/31
10,182,169 B2 * 1/2019 Tokiwa .............. H04N 1/00464
(Continued)

FOREIGN PATENT DOCUMENTS

JP 2006-191328 7/2006
JP 2007-060033 3/2007
(Continued)

OTHER PUBLICATIONS

Notice of Allowance dated Aug. 8, 2024 in U.S. Appl. No. 18/490,479.
(Continued)

*Primary Examiner* — Cao H Nguyen
(74) *Attorney, Agent, or Firm* — Venable LLP

(57) ABSTRACT

A control apparatus includes: a display-control-unit that can display on a displayer a screen in the form of tabs including tabs and corresponding menus, and that displays on the displayer a screen including a menu corresponding to a predetermined tab in accordance with selection of the pre-determined tab on the screen; a locking-control-unit that locks a menu corresponding to at least one tab out of the menus corresponding to the tabs such that no menu is displayed; and a setting-unit that sets whether to make lock setting effective or ineffective, in which if the condition that a backlight of the displayer is turned off is satisfied, based on that lock setting of a menu corresponding to a current tab that is displayed last before the backlight is turned off is set to effective, the locking-control-unit locks the menu corre-sponding to the current tab.

9 Claims, 11 Drawing Sheets

(51) Int. Cl.
  *H04N 1/00*     (2006.01)
  *H04N 1/44*     (2006.01)

(52) U.S. Cl.
  CPC ....... *H04N 1/00891* (2013.01); *H04N 1/4413*
      (2013.01); *H04N 1/4433* (2013.01); *H04N*
                *2201/0094* (2013.01)

(58) Field of Classification Search
  CPC ......... H04N 1/4433; H04N 2201/0094; H04N
                                          1/00411
  See application file for complete search history.

(56)                References Cited

U.S. PATENT DOCUMENTS

| | | | |
|---|---|---|---|
| 10,496,240 B2 | 12/2019 | Kasamatsu | ......... G06F 3/04817 |
| 10,742,824 B2 | 8/2020 | Liu | .................... H04N 1/00432 |
| 10,747,431 B2 * | 8/2020 | Ryu | ....................... G06F 1/165 |
| 10,855,780 B2 | 12/2020 | Katano et al. | ......... G06F 15/16 |
| 11,082,572 B2 | 8/2021 | Ogura | ............... H04N 1/00514 |
| 11,416,182 B2 | 8/2022 | Shirai et al. | .............. G06F 3/12 |
| 2009/0092106 A1 | 4/2009 | Nakayama | .................... 370/338 |
| 2012/0266236 A1 * | 10/2012 | Miwa | .................... H04W 12/06 |
| | | | 726/19 |
| 2013/0014017 A1 | 1/2013 | Sato | .......................... G06F 3/01 |
| 2013/0021277 A1 | 1/2013 | Kasamatsu | ............. G06F 3/041 |
| 2014/0171154 A1 | 6/2014 | Chuo | |
| 2015/0055163 A1 | 2/2015 | Kimura | |
| 2016/0277273 A1 | 9/2016 | Arai et al. | .............. H04L 12/26 |
| 2017/0085731 A1 | 3/2017 | Akuzawa | ................. H04N 1/00 |
| 2019/0250810 A1 * | 8/2019 | Yamauchi | .......... H04N 1/00474 |
| 2019/0306346 A1 * | 10/2019 | Nakamura | ......... H04N 1/00432 |
| 2020/0106898 A1 | 4/2020 | Liu | .......................... H04N 1/00 |
| 2020/0162628 A1 | 5/2020 | Horiike et al. | .... H04N 1/00477 |
| 2020/0228672 A1 | 7/2020 | Baliguat et al. | ... H04N 1/00572 |
| 2022/0166890 A1 | 5/2022 | Okuno | .................... H04N 1/00 |

FOREIGN PATENT DOCUMENTS

| | | |
|---|---|---|
| JP | 2012-093612 | 5/2012 |
| JP | 2013-025561 | 2/2013 |
| JP | 2017-059050 | 3/2017 |
| JP | 2017-211729 | 11/2017 |
| JP | 2018-126979 | 8/2018 |
| JP | 2020-052972 | 4/2020 |
| JP | 2020-052973 | 4/2020 |
| JP | 2020-088412 | 6/2020 |
| JP | 2020-112652 | 7/2020 |
| JP | 2020-137045 | 8/2020 |

OTHER PUBLICATIONS

Office Action dated Aug. 13, 2024 in Japanese Application No. 2024-071464, together with English translation thereof.
U.S. Appl. No. 18/362,002, filed Jul. 31, 2023.
U.S. Appl. No. 18/365,541, filed Aug. 4, 2023.
U.S. Appl. No. 18/230,241, filed Aug. 4, 2023.
Office Action dated Mar. 28, 2024 in U.S. Appl. No. 18/490,492.
Decision on Appeal dated Apr. 1, 2025 in counterpart Japanese Application No. 2022-171546, together with English translation thereof.
U.S. Appl. No. 18/490,461, filed Oct. 19, 2023.
U.S. Appl. No. 18/490,479, filed Oct. 19, 2023.
U.S. Appl. No. 18/490,492, filed Oct. 19, 2023.
Notice of Allowance dated Jul. 18, 2024 in U.S. Appl. No. 18/490,492.
Office Action dated Apr. 23, 2024 in counterpart Japanese Application No. 2022-171546, together with English translation thereof.
Epson LP-S8180 Series User Guide, 2020, pp. 11 and 23 [available at <https://www2.epson.jp/support/manual/NPD647103_UG_JA. PDF>], with English translation of pp. 11 and 23.
Office Action dated Nov. 19, 2024 in Japanese Application No. 2024-071464, together with English translation thereof.
Office Action dated Feb. 13, 2024 in counterpart Japanese Application No. 2022-171546.
Office Action dated Jan. 28, 2025 in Japanese Application No. 2024 071464, together with English translation thereof.

* cited by examiner 301    302    303    304

| DEFAULT | 1 | 2 | 3 |

DEFAULT COPY — 305

TWO-SIDE COPY — 306

SAVE ORIGINAL DOCUMENT TO PC — 307

501

CONTROL APPARATUS, METHOD OF CONTROLLING CONTROL APPARATUS, AND STORAGE MEDIUM

BACKGROUND

Field

The present disclosure relates to a control apparatus, a method of controlling the control apparatus, and a storage medium.

Description of the Related Art

Japanese Patent Laid-Open No. 2020-52972 discloses a multi function peripheral that displays a shortcut list screen in the form of tabs. In a general mode in which a registered user does not log in, the above-described multi function peripheral displays a common tab, and in a personal mode in which the registered user logs in, the above-described multi function peripheral displays the common tab and a personal tab corresponding to the user logging in. Additionally, the personal tab is managed so as to be able to be opened by password authentication or authentication using a card.

SUMMARY

However, for example, in a case where display for a case where a backlight is restored from a state in which the backlight is turned off because no operation is performed for a certain period of time is not clearly specified, and the personal tab is kept being displayed, there is a possibility of a deterioration in the security.

A control apparatus according to an aspect of the present disclosure includes: a display control unit that can display on a display unit a display screen in the form of tabs including multiple tabs and multiple menu screens corresponding to the multiple tabs, respectively, and that displays on the display unit a display screen including a menu screen corresponding to a predetermined tab in accordance with selection of the predetermined tab on the display screen; a locking control unit that sets a menu screen corresponding to at least one tab out of the multiple menu screens corresponding to the multiple tabs to a locked state in which the menu screen is not displayed; and a setting unit that sets whether to make lock setting effective or ineffective, in which in a case where the condition that a backlight of the display unit is put in an off state is satisfied, based on that lock setting of a menu screen corresponding to a current tab that is displayed last before the backlight is put in the off state is set to effective, the locking control unit sets the menu screen corresponding to the current tab to the locked state.

Further features of the present invention will become apparent from the following description of exemplary embodiments with reference to the attached drawings.

DESCRIPTION OF THE EMBODIMENTS

Figure 1:
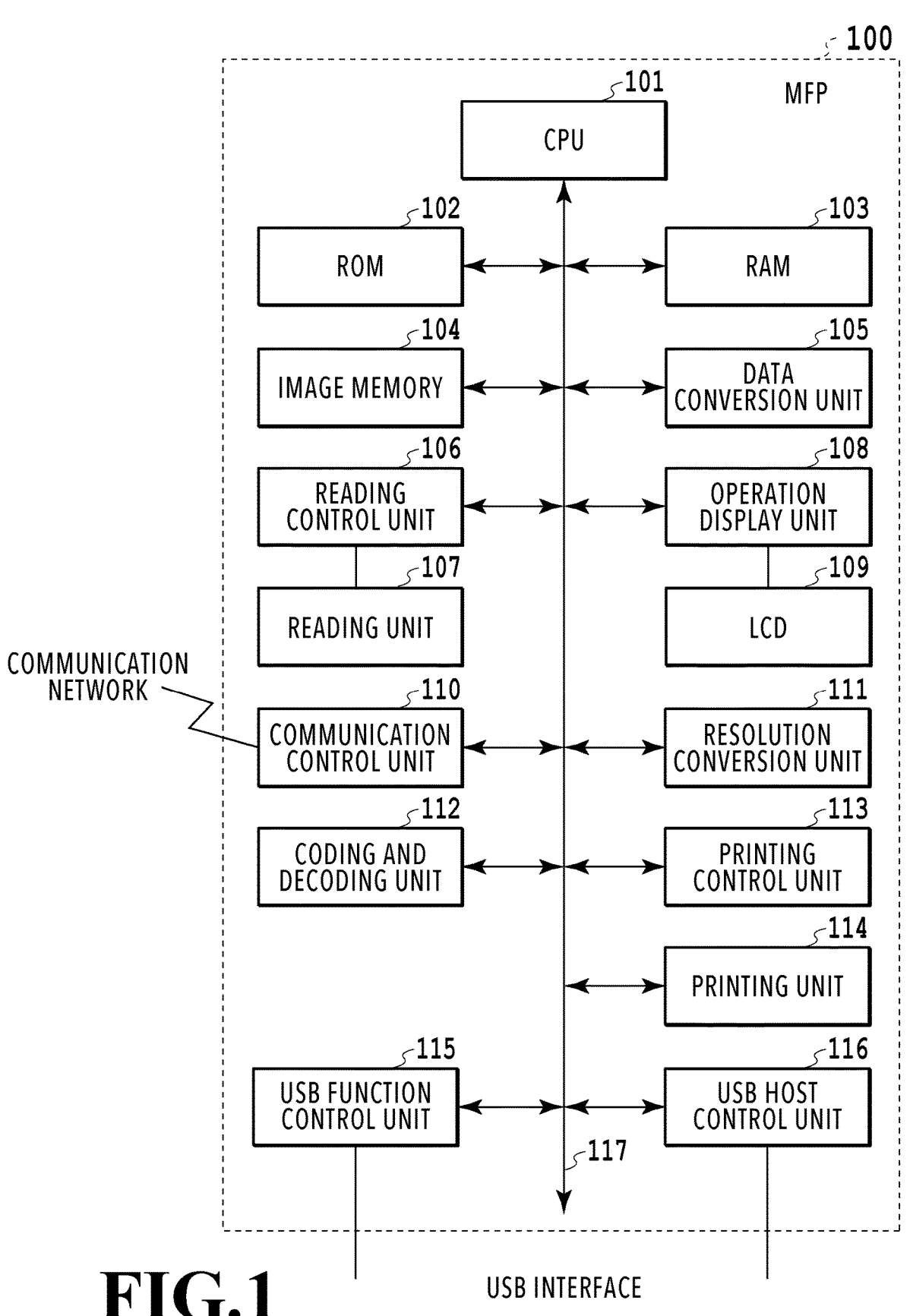
FIG. 1 is a block diagram of an MFP.

Embodiments of the present disclosure are described below with reference to the drawings. Note that, the following embodiments are not intended to limit the present disclosure, and additionally, not all the combinations of the characteristics described in the present embodiments are necessarily required for the means for solving the problems of the present disclosure. Note that, the same reference numerals are given to describe the same configurations.

Embodiment 1

<Block Diagram>

FIG. 1 is a block diagram illustrating a schematic configuration example of an MFP 100 in the present embodiment. The MFP 100 is a type of an information processing apparatus. Additionally, the MFP 100 is a type of an electronic apparatus. The MFP 100 of the present embodiment has an information processing function such as generating, storing, and transmitting device information including log information and status information. Additionally, the MFP 100 has an image formation function to form an image on a printing medium by using a printing control unit 113 and a printing unit 114 described later.

The MFP 100 includes a CPU 101, a ROM 102, a RAM 103, an image memory 104, a data conversion unit 105, a reading control unit 106, a reading unit 107, an operation display unit 108, an LCD 109, a communication control unit 110, and a resolution conversion unit 111. In addition, the MFP 100 includes a coding and decoding unit 112, the printing control unit 113, the printing unit 114, a USB function control unit 115, a USB host control unit 116, and a bus 117.

The CPU 101 is a system control unit and controls overall the MFP 100. The ROM 102 is a non-volatile memory that stores fixed data such as a control program to be executed by the CPU 101, a data table, and an embedded operating system (OS). In the present embodiment, each control program is stored in the ROM 102, and software execution control such as scheduling, task switching, or interruption processing is performed under the management by the embedded OS stored in the ROM 102. The ROM 102 stores information indicating a permission state, which indicates whether to provide device information to the outside. The RAM 103 is formed of a static random access memory (SRAM) or the like that requires a backup power supply, and feeding to the RAM 103 is guaranteed by a not-illustrated primary battery for data backup. The RAM 103 stores a program control variable and the like. The image memory 104 is formed of a dynamic random access memory (DRAM) or the like and can accumulate image data. Additionally, a part of the area in the image memory 104 is secured as a work area to execute software processing. The data conversion unit 105 can perform conversion of the image data such as page description language (PDL) analysis and computer graphics (CG) rasterization of character data.

The reading unit 107 optically reads an original document by a CIS image sensor and converts it into an electric image signal. The reading control unit 106 performs various types of image processing such as binarization processing and halftone processing to this image signal and outputs high-definition image data. Note that, a method of optically reading the original document may be either of: a sheet reading control method in which the original document is read by a fixed CIS image sensor; and a book reading control method in which the original document fixed on a platen glass is read by a moving CIS image sensor.

The operation display unit 108 includes a minimal key such as a numerical value input key, a mode setting key, a determination key, and a cancel key and a light-emitting diode (LED), a seven-segment display unit, or the like. The above-described various keys are implemented by so-called software keys displayed on the LCD 109 and can receive an operation from the user. In a case where an operation by the user is not performed for a certain period of time, the LCD 109 switches off a backlight (backlight function) of the LCD 109 to reduce the power consumption.

The communication control unit 110 controls communication between the MFP 100 and a communication network 300 and establishes connection to an Internet service provider and communication of various data with a service management server 200. Additionally, the communication control unit 110 can determine whether the MFP 100 is connected to the Internet or is connected to only a LAN. Note that, the connection between the communication control unit 110 and the communication network 300 is established by a publicly known method such as HTTP and XMPP. The resolution conversion unit 111 performs resolution conversion processing such as mutual conversion between image data in millimeters and image data in inches. Note that, the resolution conversion unit 111 also can execute enlarging and reducing processing on the image data.

The coding and decoding unit 112 performs coding and decoding processing or performs enlarging and reducing processing on the image data (uncompressed, MH, MR, MMR, JBIG, JPEG, and so on) handled by the MFP 100. The printing control unit 113 performs various types of image processing such as smoothing processing, printing density correction processing, and color correction on the image data to be printed to convert it into high-definition image data and then outputs it to the printing unit 114. Additionally, the printing control unit 113 also plays a role to regularly obtain state information data of the printing unit 114. The printing unit 114 is formed of a laser beam printer, an ink-jet printer, or the like and prints the image data generated by the printing control unit 113 on the printing medium such as a sheet.

The USB function control unit 115 performs protocol control according to the USB communication standard. The USB host control unit 116 is a control unit to establish communication based on the protocol determined by the USB communication standard. This USB communication standard is a standard for bidirectional high-speed data communication. This USB communication standard defines that multiple hubs or functions (slaves) are connectable to a single host (master). That is, the USB host control unit 116 provides a function as a host in the USB communication. The constituents other than the reading unit 107 and the LCD 109 are connected to each other through the bus 117.

<Operation Display Unit>

The operation display unit 108 according to the present embodiment includes a screen in the form of tabs.

Figure 2:
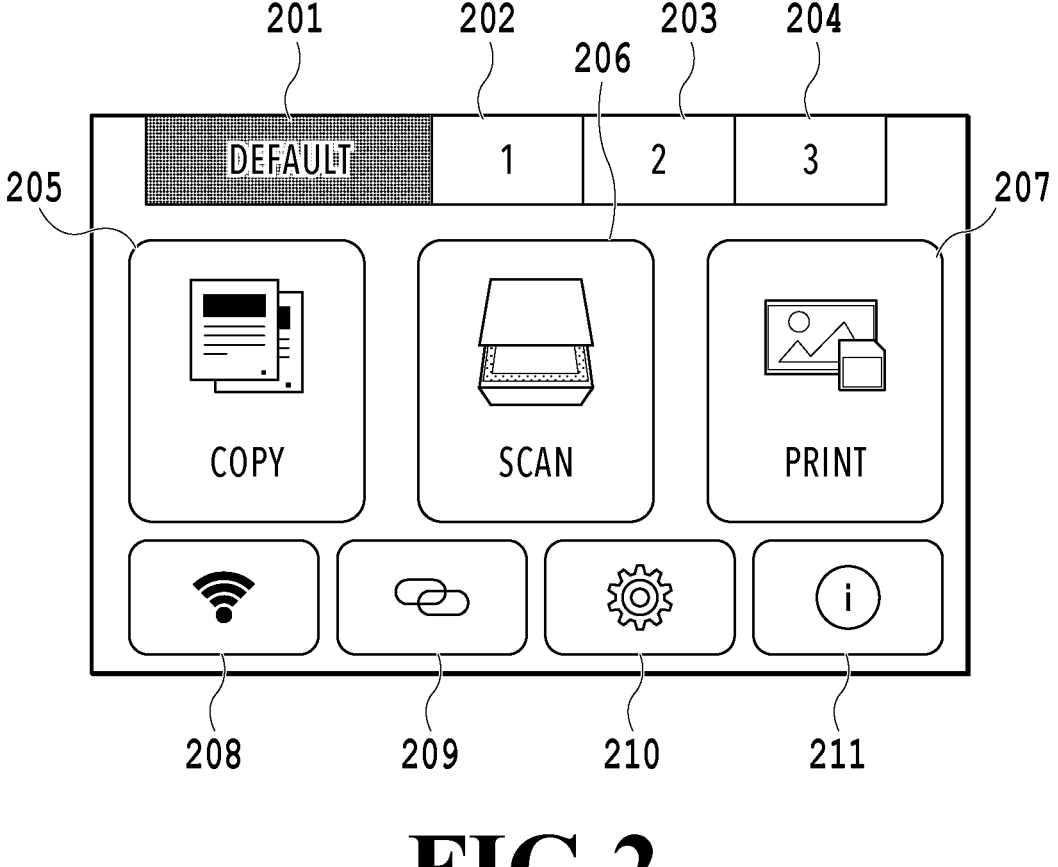
FIG. 2 is a diagram illustrating a default home screen displayed on an operation display unit.

FIG. 2 is a diagram illustrating a default home screen displayed on the operation display unit 108. A tab 201 is a tab corresponding to the default home screen. Tabs 202, 203, and 204 are tabs (custom tabs.) each corresponding to a custom home screen. Hereinafter, the expression "tab" may also express a menu screen corresponding to the tab. The user can switch the home screens by pressing the tabs. Additionally, the different tab color of the tab 201 from the color of the other tabs indicates that the screen (that is, the default home screen) of the currently displayed tab (the current tab) 201 is currently displayed. The default home screen includes a copy menu button 205, a scan menu button 206, a print menu button 207, a LAN button 208, a wireless connection button 209, a setting button 210, and a hint button 211. A transition to a screen corresponding to each button is made with the user pressing each button. Specifically, for example, in a case where the copy menu button 205 is pressed, an area into which the setting for copying is inputted or a screen to instruct the execution of copying is displayed. On the default home screen, unlike the custom home screen described later, a button that is determined in advance is displayed without the arbitrary selection by the user. However, it is not limited to this mode. A mode in which the user can arbitrarily select or change the button to be displayed on the default home screen may be applicable.

Figure 3:
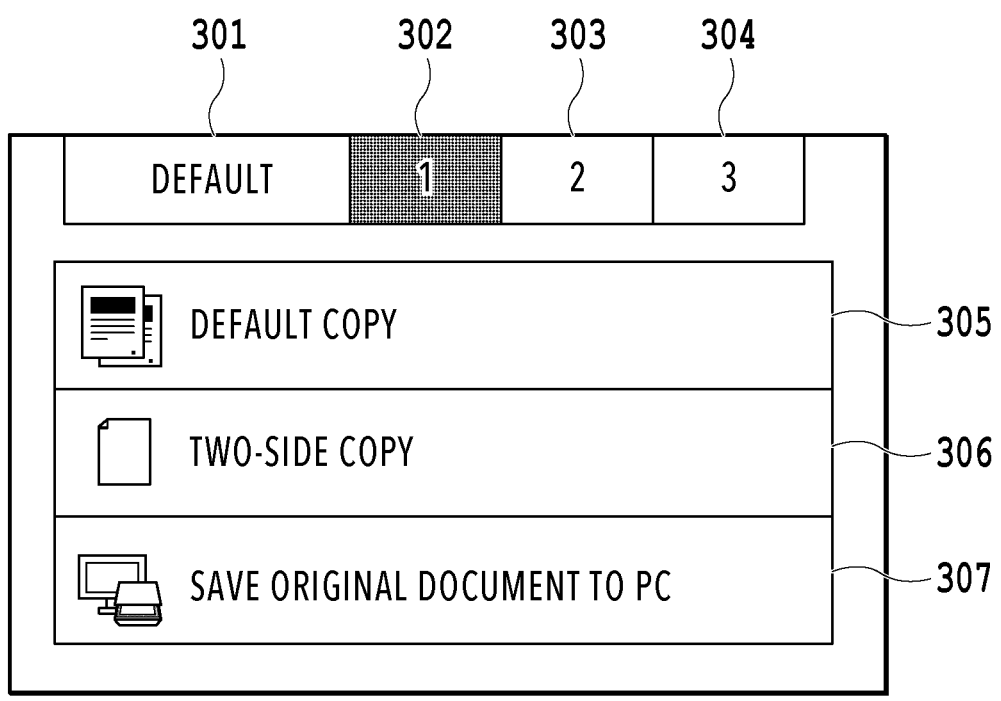
FIG. 3 is a diagram illustrating a custom home screen displayed on the operation display unit.

FIG. 3 is a diagram illustrating the custom home screen of the tab 202 displayed on the operation display unit 108. The different tab color of the tab 202 from the color of the other tabs indicates that the custom home screen of the tab 202 is currently displayed. The custom home screen of the tab 202 includes custom menus (screen) 305, 306, and 307. Each menu is a menu that can be customized by the user, and it is possible to designate a function to be displayed in each menu position. In FIG. 3, "default copy" is set as the custom menu 305, "two-side copy" is set as the custom menu 306, and "save original document to PC" is set as the custom menu 307, respectively. Note that, unlike the default home screen, it is possible to register a menu associated with setting of processing executed from each menu on the custom home screen. That is, for example, in a case of the copying executed from the copy menu button 205, it is necessary to set additionally whether the copying is two-side copy or one-side copy after the copy menu button 205 is pressed. However, in a case of the copying executed from the custom menu 306, it is unnecessary to set additionally whether the copying is two-side copy or one-side copy after the custom menu 306 is pressed. Additionally, login information and cookie information may be saved in association with each home screen. Moreover, it is possible to set a lock to each custom home screen. In the present embodiment, the lock means control to prevent displaying of the custom home screen in a case where there is no input of a correct password into a password (authentication information) input screen. In a case of the custom home screen to which no lock is set, once the tab corresponding to the custom home screen is operated, the custom home screen is displayed without displaying the password input screen. The setting of the custom menu and the setting of the lock of the custom home screen can be performed from the setting button 210 in FIG. 2.

Figure 4:
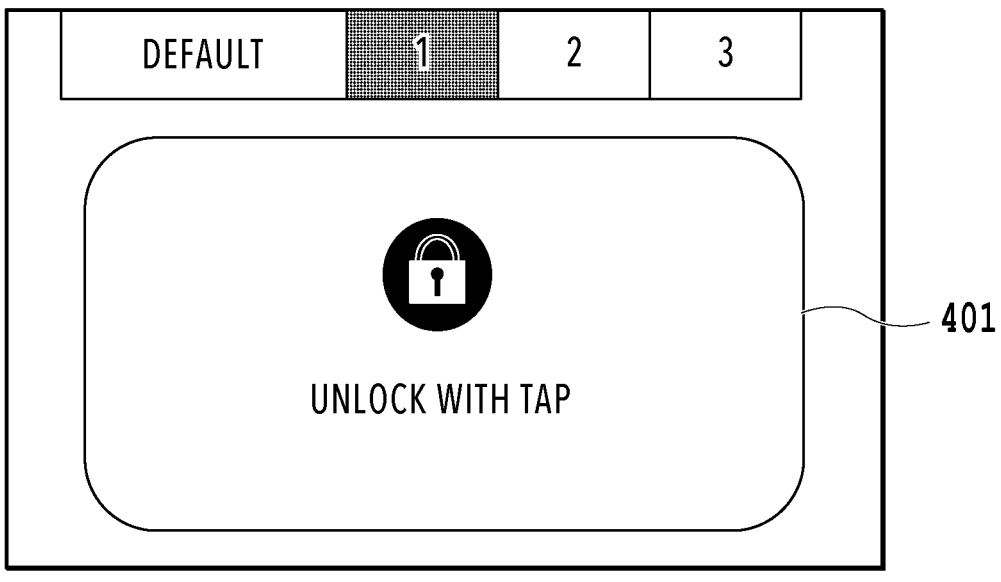
FIG. 4 is a diagram illustrating a locked screen of a custom home that is displayed on the operation display unit.

FIG. 4 is a diagram illustrating a locked screen of the tab 202 that is displayed on the operation display unit 108. In a case where the user selects the tab 202, which is a tab corresponding to the custom home screen executed locking control, the custom home screen is not displayed but the screen illustrated in FIG. 4 is displayed. With the user pressing an unlock button 401, the password input screen is displayed, and if the inputted password matches the correct password, the custom home screen of the tab 202 is displayed. Note that, the correct password is set for each tab. In the present embodiment, a locked state is a state in which a user operation on the menu screen corresponding to the selected tab (target tab) is limited. For example, it is a state in which the menu screen corresponding to the selected tab is not displayed as illustrated in FIG. 4. Alternatively, it may be a state in which the menu screen corresponding to the selected tab is displayed but it may be a state in which the displayed contents are not changeable.

In the present embodiment, in a case where a menu of another tab is displayed from the custom home screen of the tab 202 currently displayed, and thereafter the tab 202 is pressed again, the locked screen is not displayed, and the custom home screen of the tab 202 is displayed without the password input by the user.

Figure 5:
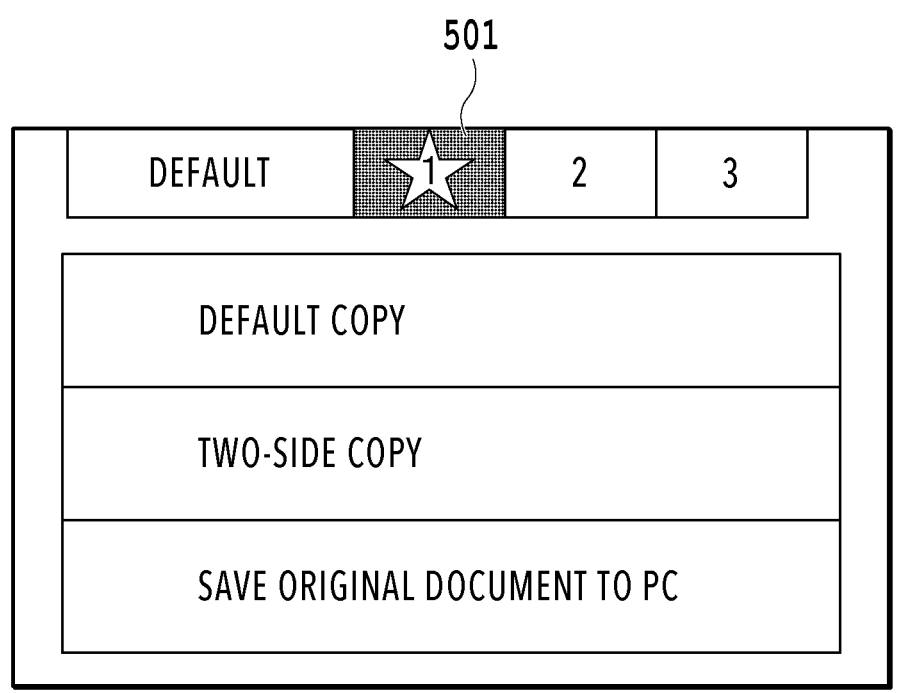
FIG. 5 is a diagram illustrating the custom home screen after being unlocked that is displayed on the operation display unit.

FIG. 5 is the custom home screen in an unlocked state (being unlocked) that is displayed on the operation display unit 108. An unlocked state icon 501 indicates that the lock setting of the currently displayed custom home screen corresponding to the tab 202 is unlocked.

In the present embodiment, the user can lock the tab by pressing the unlocked state icon (that is, the tab 202 in FIG. 5). Note that, the unlocked state icon 501 is not displayed on a tab in which the lock setting is ineffective, and no processing is performed even in a case where the tab of the custom home screen currently displayed is pressed. Note that, the setting of whether to make the lock setting of the tab effective or ineffective is performed in advance for each tab. The setting of whether to make the lock setting of the tab effective or ineffective may be performed from the setting button 210, for example.

<Flowchart>

Figure 6:
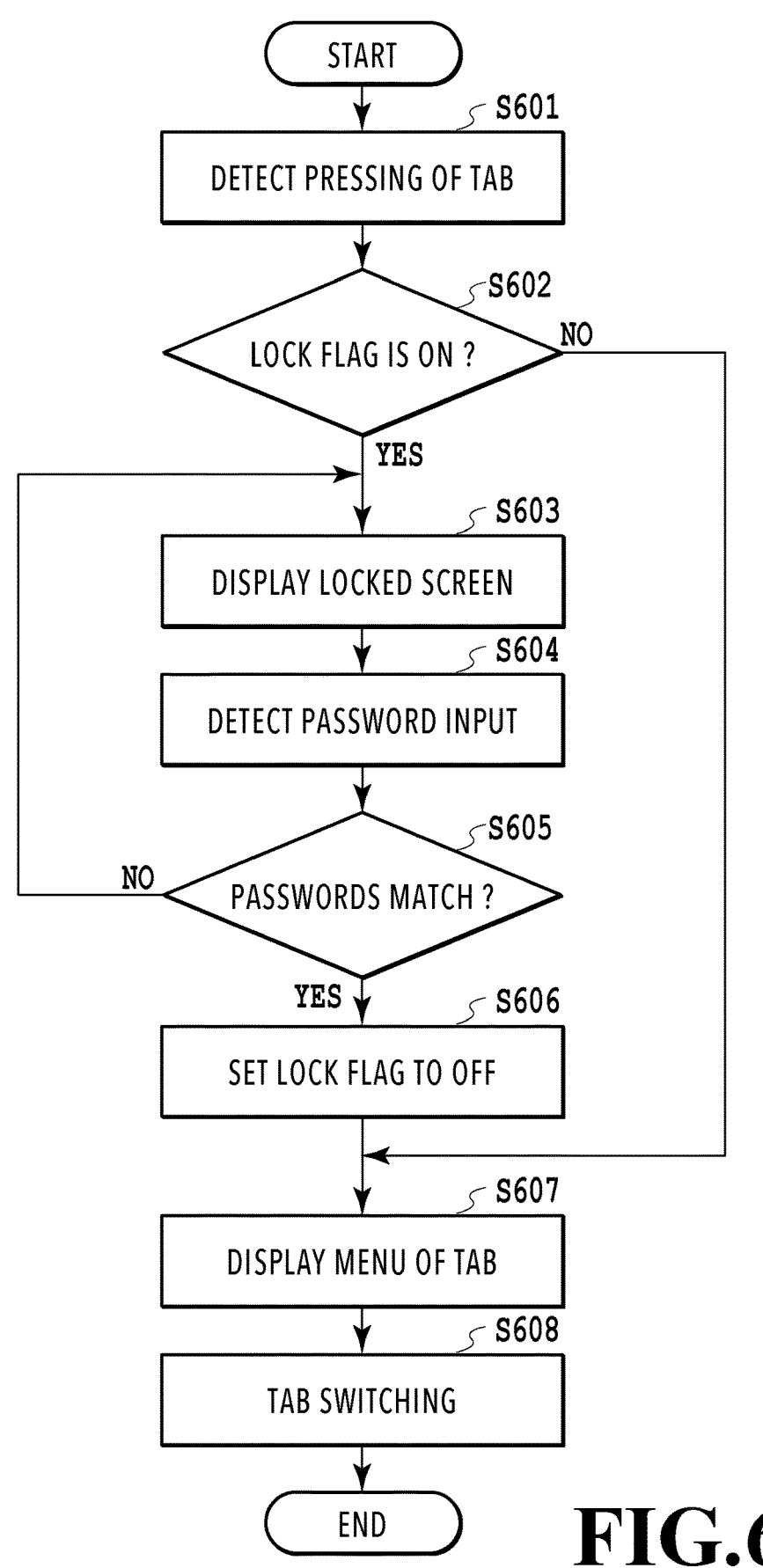
FIG. 6 is a flowchart illustrating an unlocking sequence of the custom home screen.

FIG. 6 is a flowchart describing an unlocking sequence of the present embodiment. A flow of the processing by the user to unlock the tab is described with reference to FIG. 6. A series of the processing illustrated in the present flowchart is performed with the CPU 101 of the MFP 100 deploying a program code stored in the ROM 102 to the RAM 103 to execute. Note that, "S" in each description of the processing below means that it is a step in the flowchart, and the same applies to the subsequent embodiments. The present processing is executed in a case where the user presses the tab of the custom home screen. Additionally, the present processing is started with the operation display unit 108 detecting an operation by the user such as touching.

First, in S601, the CPU 101 detects the tab that is pressed by the user. In S602, the CPU 101 determines whether a lock flag of the tab is ON. The lock flag of the tab is individually prepared for each tab and is set to ON in a locking operation of the tab. Details related to the locking operation of the tab are described later. If the lock flag is OFF, in S607, the CPU 101 displays the menu of the tab. Note that, the lock flag of the tab in which the lock setting is ineffective is constantly OFF. As mentioned above, the setting of whether to make the lock setting of the tab effective or ineffective is set in advance for each tab.

If the lock flag is ON, in S603, the CPU 101 displays the locked screen as illustrated in FIG. 4. In S604, once the CPU

101 detects the password input from the user, in S605, whether the passwords match is determined. If the passwords do not match, the locked screen is displayed again in S603. If the passwords match, in S606, the lock flag is set to OFF, and thereafter, in S607, the menu of the tab is displayed.

In S608, in a case where the switching to another tab is performed by the user operation, the CPU 101 maintains the state of the lock flag of the previous tab before the switching, in which the lock flag is set to OFF in S606, to OFF. Thus, in a case where it is detected in S601 that the tab is pressed again, it is determined in S602 that the lock flag is OFF, and the user can display the menu of the tab without inputting the password. This is the flow of the processing to unlock the tab.

Next, processing by the user to lock the tab is described.

Figure 7:
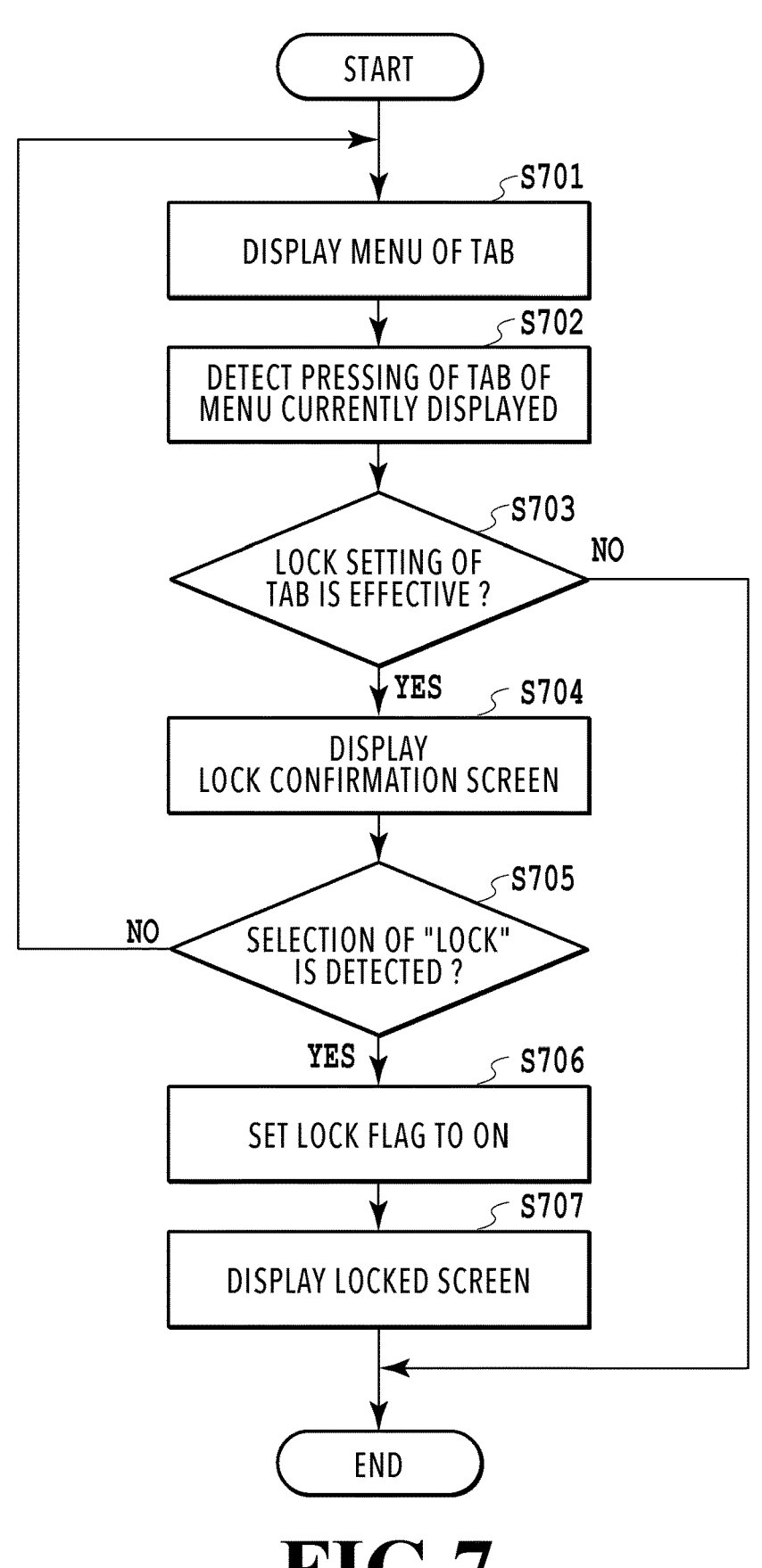
FIG. 7 is a flowchart illustrating a locking sequence of the custom home screen by a tab operation.

FIG. 7 is a flowchart describing a processing sequence in a case where the user locks the tab. A series of the processing illustrated in the present flowchart is performed with the CPU 101 of the MFP 100 deploying a program code stored in the ROM 102 to the RAM 103 to execute. The present processing is started with the tab being set to the unlocked state by an unlocking operation by the user such as password authentication.

In S701, the CPU 101 displays the menu of the predetermined tab on the operation display unit 108. In S702, the CPU 101 determines whether the pressing of the tab of the menu currently displayed on the operation display unit 108 is detected. In the present step, for example, if it is determined that no pressing of the tab is detected until a period of time determined in advance passes, the CPU 101 ends the processing of the present flowchart. On the other hand, if it is determined that the pressing of the tab is detected until the period of time determined in advance passes, in S703, whether the lock setting of the tab is effective is determined. As mentioned above, the setting of whether to make the lock setting of the tab effective or ineffective is performed in advance for each tab. If the lock setting of the tab is ineffective, the processing ends. If the lock setting of the tab is effective, in S704, a lock confirmation screen is displayed. The lock confirmation screen is a display screen 850 in FIG. 8, for example. Meanwhile, the user selects whether to lock the tab on the lock confirmation screen. If it is detected that do not lock is selected by the user operation on the lock confirmation screen, the CPU 101 causes the processing to return to S701. If it is detected in S705 that to lock is selected, in S706, the CPU 101 sets the lock flag to ON, and after the locked screen is displayed in S707, the CPU 101 ends the processing of the present flowchart. This is the flow of the processing in a case where the tab is locked by the user.

Next, a screen transition in a case of turning off the backlight of the operation display unit 108 is described. The backlight of the operation display unit 108 is put in an on state in a case where the screen is displayed by an operation by the user on the operation display unit 108 and in a case where the screen is displayed on the operation display unit 108 by powering on the MFP 100. Additionally, if no operation by the user is detected for a certain period of time while the backlight is in the on state, the backlight is put in an off state to reduce the power consumption. That is, the state in which the backlight is turned on is a state in which the screen is displayed on the operation display unit 108, and the state in which the backlight is turned off is a power-saving state in which no screen is displayed on the operation display unit 108.

Figure 8:
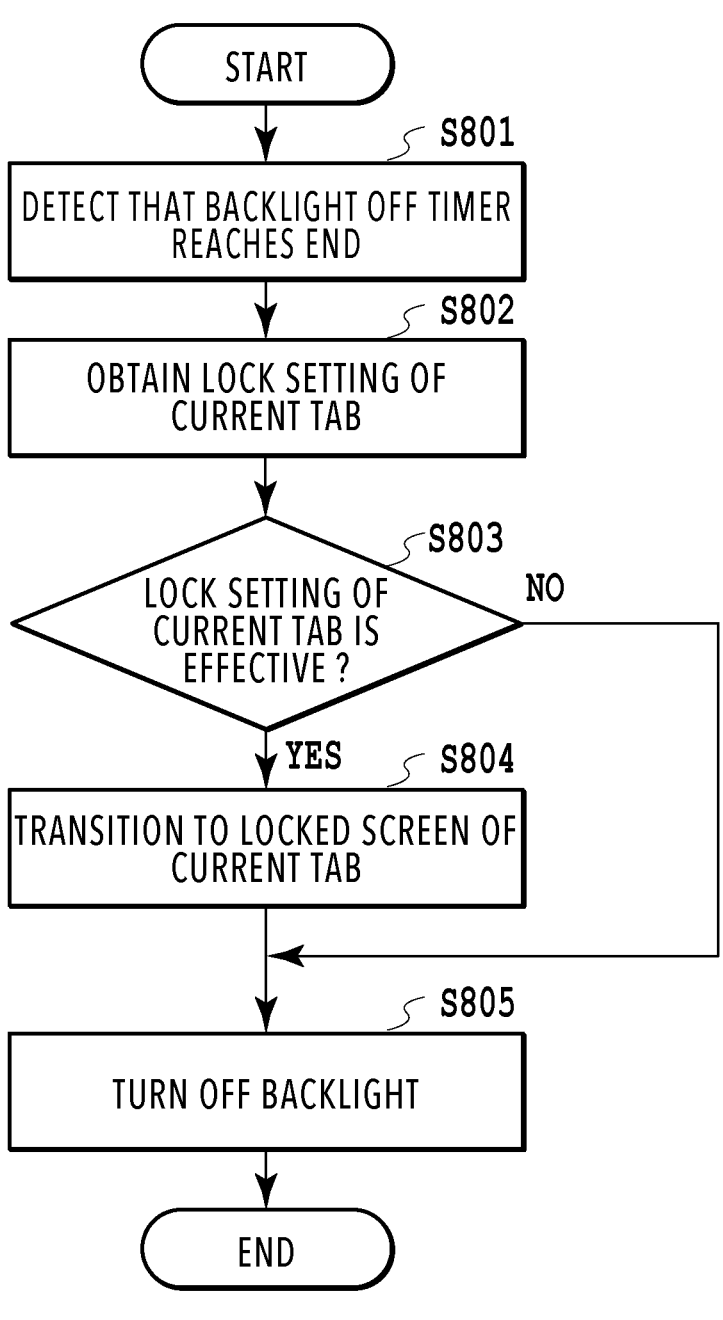
FIG. 8 is a flowchart illustrating a screen transition sequence in a case of turning off a backlight.

FIG. 8 is a flowchart illustrating a screen transition in a case of turning off the backlight. A series of the processing illustrated in the present flowchart is performed with the CPU 101 of the MFP 100 deploying a program code stored in the ROM 102 to the RAM 103 to execute.

First, in S801, the CPU 101 detects that a backlight off timer reaches the end. That is, in order to turn off the backlight after a predetermined period of time passes, the CPU 101 activates the timer to turn off the backlight and counts the period of time passed after there is no user operation on the operation display unit 108. In S801, the CPU 101 detects that the predetermined period of time passes. The period of time set in the timer is set by the user in advance.

In S802, the CPU 101 obtains the lock setting of the current tab. The current tab in this case is a tab currently displayed, and in the backlight off state, it is a tab that is displayed last before the backlight is turned off. Note that, a case where the condition that the backlight is turned off is satisfied is a case where the predetermined period of time passes after there is no user operation on the operation display unit 108 (that is, a case where the predetermined period of time passes after the timer to turn off the backlight is activated).

In S803, the CPU 101 determines whether the lock setting of the current tab is effective. If it is determined that the lock setting of the current tab is effective, in S804, the CPU 101 executes locking control to set the lock of the current tab to the locked state and allows the display screen to transition to the locked screen of the current tab. Thereafter, in S805, the backlight is turned off, and the processing of the present flowchart ends. Note that, the processing in S804 can also be performed in a case of turning on the backlight. That is, even in a case where the lock setting of the current tab is effective in S803, the backlight is turned off without performing S804. Thereafter, in a case of turning on the backlight, the locked screen of the current tab may be display-controlled for the tab in which the lock setting is effective. That is, the locked screen may be displayed in a stage in which the backlight is turned off or may be displayed in a case of turning on the backlight.

In S803, if the CPU 101 determines that the lock setting of the current tab is ineffective, in S805, the CPU 101 turns off the backlight. Thereafter, the CPU 101 ends the processing of the present flowchart.

As above, in a case where the backlight is turned off by the processing in the flowchart in FIG. 8 on the screen in a layer of or below the tab in which the lock setting is effective, the locked screen is displayed on the operation display unit 108 in a case where the backlight is turned on. On the other hand, in a case where the backlight is turned off on the screen in a layer of or below the tab in which the lock setting is ineffective, once the backlight is turned on, the screen that is displayed before the backlight is turned off is displayed on the operation display unit 108. Thus, it is possible to secure the security for the current tab in which the lock setting is effective in a case of turning off the backlight. Note that, since the processing in the flowchart in FIG. 8 is processing for the current tab currently displayed, a tab lock is not applied to the other tabs, and thus it is possible to secure the operability.

Next, a method of setting all the tabs in which the lock setting is effective to the locked state in a case where the CPU 101 turns off the backlight of the operation display unit 108 is described.

Figure 9:
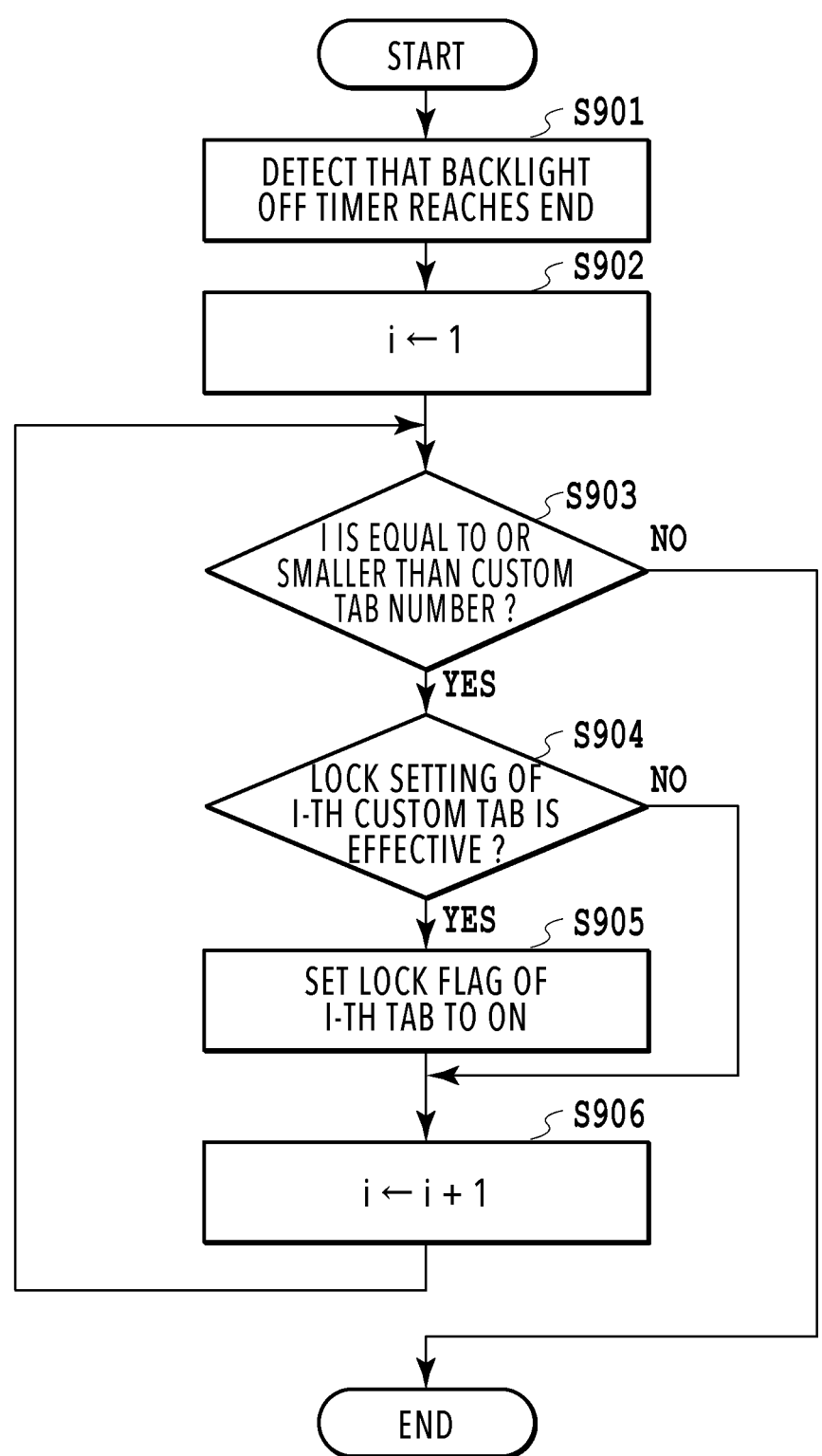
FIG. 9 is a flowchart illustrating a custom home screen locking sequence in a case of turning off the backlight.

FIG. 9 is a flowchart describing a lock processing sequence in a case of turning off the backlight. A series of the processing illustrated in the present flowchart is performed with the CPU 101 of the MFP 100 deploying a program code stored in the ROM 102 to the RAM 103 to execute.

In S901, once the CPU 101 detects that a backlight off timer reaches the end, in S902, the CPU 101 initializes an index i to 1. In S903, the CPU 101 determines whether the index i is equal to or smaller than the custom tab number. If the index i is equal to or smaller than the custom tab number in S903, in S904, the CPU 101 determines whether the lock setting of the i-th custom tab is effective. If the lock setting of the i-th custom tab is effective, in S905, the CPU 101 sets the lock flag of the i-th custom tab to ON.

If the lock setting of the i-th custom tab is ineffective in S904, or after the lock flag of the i-th custom tab is set to ON in S905, in S906, the CPU 101 increments the index i by one. After S906 is executed, in S903, whether the index i is equal to or smaller than the custom tab number is determined again. If the index i is greater than the tab number in S903, the CPU 101 ends the processing of the present flowchart. Thus, it is possible to lock the tabs in the ascending order of the number of the tabs until the index i reaches the same value as the custom tab number. That is, it is possible to set all the tabs with the effective lock setting to the locked state at the timing at which the backlight is turned off. With this processing, even in a case where the user after finishing with the operation forgets an operation such as logging out, it is possible to lock the tab that should be in the locked state after a certain period of time passes. Thus, it is possible to improve the security more than the processing to lock only the current tab that is described in FIG. 8.

Next, tab switching processing of the present embodiment is described with reference to FIGS. 10 and 11. In the tab switching processing of the present embodiment, in a case where the software is turned on for the MFP 100 (the MFP 100 is activated according to a power-on operation), the menu screen of a default tab is not displayed but the tab that is displayed last in the last time the MFP 100 is used is displayed. Hereinafter, the tab displayed last is also referred to as a target tab. Note that, in the following description of the tab switching, the display screen as illustrated in FIG. 2 including four tabs, which are the default tab, a tab 1, a tab 2, and a tab 3, is described.

Figure 10:
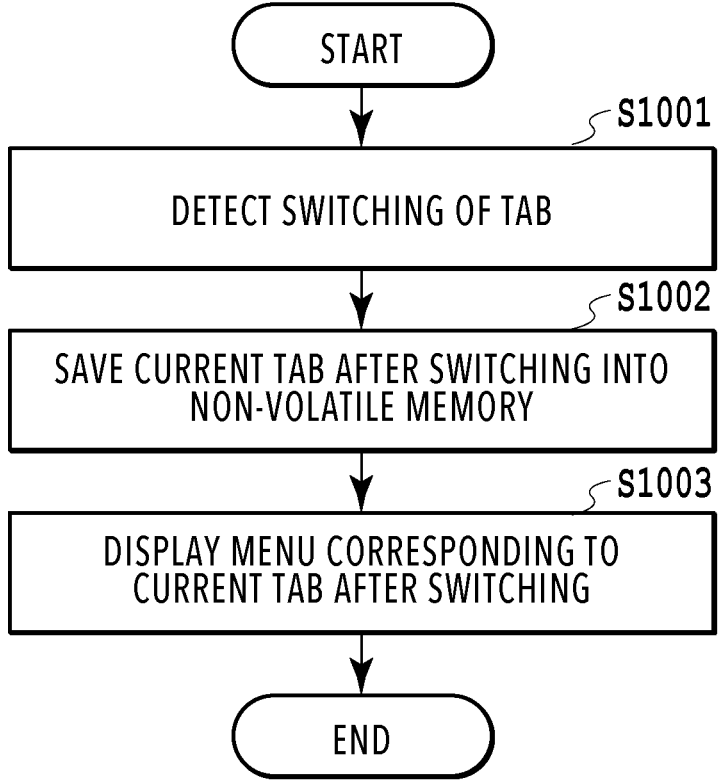
FIG. 10 is a flowchart illustrating a sequence of tab switching.

FIG. 10 is a flowchart describing a sequence of the tab switching. A series of the processing illustrated in the present flowchart is performed with the CPU 101 of the MFP 100 deploying a program code stored in the ROM 102 to the RAM 103 to execute.

In S1001, the CPU 101 detects the switching of the tab. In S1002, the CPU 101 saves the tab after switching into the non-volatile memory. The saved tab in the present processing is referred to as the current tab. Thereafter, in S1003, the menu corresponding to the tab after switching is displayed, and the CPU 101 ends the processing in the present flowchart. For example, in a case where the tab after switching is the tab 2, in S1003, the CPU 101 displays the menu screen corresponding to the tab 2 on the operation display unit 108.

Figure 11:
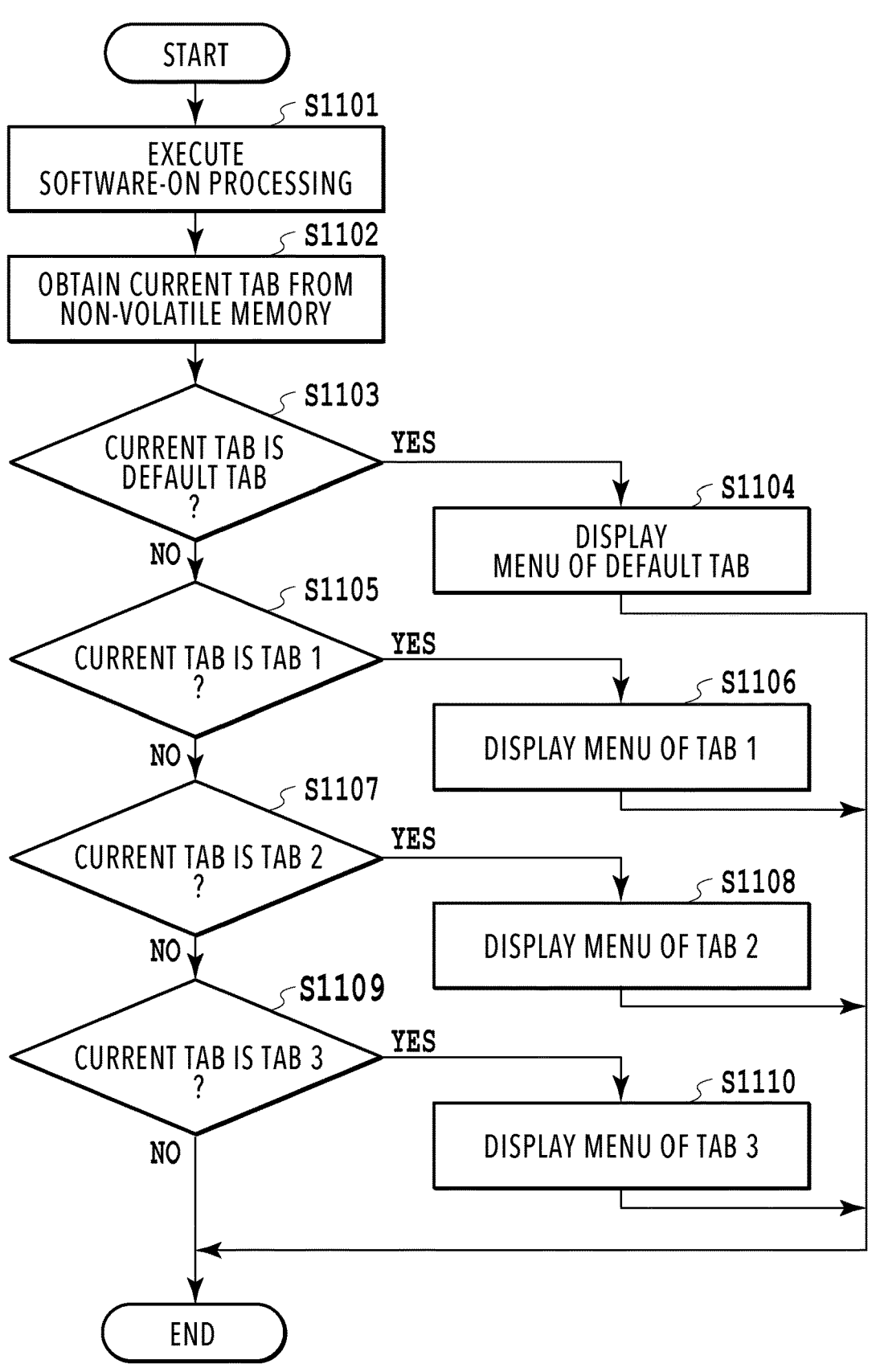
FIG. 11 is a flowchart illustrating a sequence of screen displaying in a case of turning on software.

FIG. 11 is a flowchart describing a screen displaying sequence in a case of turning on the software. A series of the processing illustrated in the present flowchart is performed with the CPU 101 of the MFP 100 deploying a program code stored in the ROM 102 to the RAM 103 to execute. The present processing is started by pressing a power supply button in a state in which the power supply is turned off (a power-off state).

In S1101, the CPU 101 executes software-on processing. That is, the CPU 101 activates the MFP 100 according to power-on. Next, in S1102, the CPU 101 obtains the current tab saved in the non-volatile memory in S1002 in FIG. 10.

In S1103, the CPU 101 determines whether the current tab is the default tab or the custom tab. If the current tab is the default tab (if it is determined as YES in S1103), in S1104, the CPU 101 displays the menu of the default tab on the operation display unit 108 and ends the processing in the present flowchart. If the current tab is not the default tab (if it is determined as NO in S1103), in S1105, the CPU 101 determines whether the current tab is the tab 1. If the current tab is the tab 1 (if it is determined as YES in S1105), in S1106, the CPU 101 displays the menu screen of the tab 1 on the operation display unit 108 and ends the processing in the present flowchart. If the current tab is not the tab 1, (if it is determined as NO in S1105), in S1107, the CPU 101 determines whether the current tab is the tab 2. If the current tab is the tab 2 (if it is determined as YES in S1107), in S1108, the CPU 101 displays the menu of the tab 2 on the operation display unit 108. Thereafter, the processing in the present flowchart ends. If the current tab is not the tab 2 (if it is determined as NO in S1107), in S1109, the CPU 101 determines whether the current tab is the tab 3. If the current tab is the tab 3 (if it is determined as YES in S1109), in S1110, the CPU 101 displays the menu of the tab 3 on the operation display unit 108 and ends the processing in the present flowchart. If the current tab is not the tab 3 (if it is determined as NO in S1109), the CPU 101 ends the processing in the present flowchart. With the above-described processing, in a case of powering on the MFP 100, it is possible to display the tab that is displayed the last time the MFP 100 is powered off.

Note that, in a case where the lock setting of the tab is effective in S1104, S1106, S1108, and S1110 in FIG. 11, the menu screen corresponding to the tab is set to the locked state, and the screen in the locked state is displayed. In addition, the CPU 101 displays the menu screen of the tab in a case where the correct password is inputted by the user.

As above, it is possible to improve the security of the display screen by performing the processing described in FIGS. 10 and 11. Specifically, in a case where the condition that the backlight of the operation display unit 108 of the MFP 100 is turned off is satisfied, it is possible to control the tab being displayed to be the locked state based on whether the lock setting is effective or ineffective.

OTHER EMBODIMENTS

Note that, although the display screen of the MFP 100 is described as an example in the present embodiment described above, it is not limited thereto, and the present embodiment may be applicable to any apparatus as long as the apparatus includes an operation display unit. Additionally, for example, the MFP 100 may cause another apparatus (a smartphone or a PC) communicated with the MFP 100 to display each screen described above to execute the setting of the MFP 100 and to cause the MFP 100 to execute various types of processing. Moreover, the present disclosure may be applicable to the screen displayed on the other apparatus.

Additionally, the above-described embodiments are implemented by executing the following processing. That is, it is processing in which software (a program) implementing the functions of the above-described embodiments is supplied to a system or an apparatus through a network or various storage media, and a computer (a CPU, an MPU, or the like) of the system or the apparatus reads the program to execute. Moreover, the program may be executed by a single computer or may be executed by multiple computers cooperating with each other. Furthermore, it is unnecessary to implement all the types of processing described above by the software, and a part of or all the types of processing may be implemented by hardware such as an ASIC. Additionally, the CPU is not limited to a single CPU that performs all the types of processing, and multiple CPUs may perform the processing in cooperation with each other as needed.

Moreover, execution of the program code read by the computer is not the only way to implement the functions of the examples mentioned above. A case where a part of or all the types of actual processing is performed by an OS and the like operating on the computer based on an instruction of the program code, and the functions of the above-mentioned embodiments are implemented by the processing is also included.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-171546, filed Oct. 26, 2022, which is hereby incorporated by reference wherein in its entirety.

What is claimed is:

1. A control apparatus, comprising:

at least one memory storing instructions; and at least one processor that, upon execution of the stored instructions, causes the control apparatus to:

display on a display a display screen in a form of tabs including a plurality of tabs and a plurality of menu screens corresponding to the plurality of tabs, respectively, and display on the display a display screen including a menu screen corresponding to a predetermined tab in accordance with selection of the predetermined tab on the display screen;

perform locking control to set a menu screen corresponding to at least one tab out of the plurality of menu screens corresponding to the plurality of tabs to locked state in which the menu screen is not displayed; and set for each menu screen corresponding to the tab whether to make lock setting to set the menu screen corresponding to the tab to the locked state effective, wherein in a case where a condition that a backlight of the display is put in an off state is satisfied, based on that lock setting of a menu screen corresponding to a current tab that is displayed last before the backlight is put in the off state is set to effective, the locking control is performed to set the menu screen corresponding to the current tab to the locked state.

2. The control apparatus according to claim 1, wherein in a case where the condition that the backlight of the display is put in the off state is satisfied, based on that the lock setting of the menu screen corresponding to the current tab is set to effective, and the backlight of the display is put in an on state, the locking control is performed to set the menu screen corresponding to the current tab to the locked state.

3. The control apparatus according to claim 2, wherein in a case where authentication information inputted to a screen of the tab in the locked state matches authentication information that is set in advance to the screen of the tab in the locked state, the locking control is performed to set the menu screen of the tab to an unlocked state from the locked state.

4. The control apparatus according to claim 3, wherein in a case where the tab in the locked state is set to the unlocked state, the displaying displays the menu screen corresponding to the tab that was in the locked state.

5. The control apparatus according to claim 1, wherein based on that the backlight of the display is put in the off state, the locking control is performed to set all the menu screens of tabs in which the lock setting is effective that are displayed on the display screen to the locked state.

6. The control apparatus according to claim 1, wherein the backlight is turned on in a case where the display screen is displayed and is turned off in a case where a predetermined period of time passes after no operation by a user on the display is detected.

7. The control apparatus according to claim 1, wherein a case where the condition that the backlight of the display is put in the off state is satisfied is that a predetermined period of time passes after no operation by a user on the display is detected.

8. A method of controlling a control apparatus, comprising:

while it is possible to display on a display a display screen in a form of tabs including a plurality of tabs and a plurality of menu screens corresponding to the plurality of tabs, respectively, displaying on the display a display screen including a menu screen corresponding to a predetermined tab in accordance with selection of the predetermined tab on the display screen;

setting a menu screen corresponding to at least one tab out of the plurality of menu screens corresponding to the plurality of tabs to a locked state in which the menu screen is not displayed; and setting whether to make lock setting effective or ineffective, wherein in a case where a condition that a backlight of the display is put in an off state is satisfied, based on that lock setting of a menu screen corresponding to a current tab that is displayed last before the backlight is put in the off state is set to effective, the menu screen corresponding to the current tab is set to the locked state.

9. A non-transitory computer readable storage medium storing a program which functions in a control apparatus and causes the control apparatus to:

display on a display a display screen in a form of tabs including a plurality of tabs and a plurality of menu screens corresponding to the plurality of tabs, respectively, and display on the display a display screen including a menu screen corresponding to a predetermined tab in accordance with selection of the predetermined tab on the display screen;

perform locking control to set a menu screen corresponding to at least one tab out of the plurality of menu screens corresponding to the plurality of tabs to locked state in which the menu screen is not displayed; and set for each menu screen corresponding to the tab whether to make lock setting to set the menu screen corresponding to the tab to the locked state effective, wherein in a case where a condition that a backlight of the display is put in an off state is satisfied, based on that lock setting of a menu screen corresponding to a current tab that is displayed last before the backlight is put in the off state is set to effective, the locking control is performed to set the menu screen corresponding to the current tab to the locked state.

* * * * *